United States Patent [19]

Eckberg

[11] Patent Number: 5,583,195

[45] Date of Patent: Dec. 10, 1996

[54] PHOTOCURABLE EPOXY SILICONES FUNCTIONALIZED WITH FLUORESCENT OR PHOTOSENSITIZING MARKER DYES

[75] Inventor: Richard P. Eckberg, Saratoga Springs, N.Y.

[73] Assignee: General Electric Company, Waterford, N.Y.

[21] Appl. No.: 536,867

[22] Filed: Sep. 29, 1995

[51] Int. Cl.$^6$ .................................................. C08G 77/06
[52] U.S. Cl. .......................... 528/26; 528/25; 528/40; 528/27; 528/28; 528/43; 556/428; 556/440; 556/436; 556/423; 522/31; 522/32; 522/148
[58] Field of Search ........................... 528/25, 40, 26, 528/27, 28, 43; 556/428, 440, 436, 423; 522/31, 32, 148

[56] References Cited

U.S. PATENT DOCUMENTS

| | | | |
|---|---|---|---|
| 2,950,986 | 8/1960 | Bailey et al. | 117/33.3 |
| 3,427,273 | 2/1969 | Newing, Jr. | 260/30.4 |
| 3,741,932 | 6/1973 | Smith | 260/46.5 E |
| 4,617,238 | 10/1986 | Crivello et al. | 428/452 |
| 4,714,770 | 12/1987 | Hsu et al. | 556/419 |
| 4,746,751 | 5/1988 | Oviatt, Jr. et al. | 556/456 |
| 4,866,152 | 9/1989 | Lo | 528/25 |
| 4,981,881 | 1/1991 | Crivello et al. | 522/31 |
| 4,987,158 | 1/1991 | Eckberg | 522/31 |
| 5,034,491 | 7/1991 | Wewers et al. | 528/41 |
| 5,138,012 | 8/1992 | Riding et al. | 525/478 |
| 5,176,906 | 1/1993 | Lamb et al. | 424/70 |
| 5,178,959 | 1/1993 | Eckberg et al. | 428/447 |
| 5,227,410 | 7/1993 | Eckberg et al. | 522/75 |
| 5,240,971 | 8/1993 | Eckberg et al. | 522/31 |
| 5,258,480 | 11/1993 | Eckberg et al. | 528/15 |
| 5,360,833 | 11/1994 | Eckberg et al. | 528/25 |
| 5,369,205 | 11/1994 | Eckberg et al. | 525/478 |

FOREIGN PATENT DOCUMENTS

WO9407965   4/1994   WIPO.

Primary Examiner—Margaret W. Glass
Attorney, Agent, or Firm—Kenneth S. Wheelock

[57] ABSTRACT

Epoxysilicone polymers partially or completely functionalized by a fluorescent, photo-sensitizing, or simultaneously fluorescing and photo-sensitizing substituent bonded to the silicone polymer by means of a carbon oxygen carbon bond provide fluorescent dye marking compounds for silicone compositions that are particularly useful in determining the quality of release coatings made therewith.

16 Claims, No Drawings

PHOTOCURABLE EPOXY SILICONES FUNCTIONALIZED WITH FLUORESCENT OR PHOTOSENSITIZING MARKER DYES

FIELD OF THE INVENTION

The present invention relates to functionalized silicone polymers wherein the functionalization of the polymer relates to the presence of ultraviolet active absorption centers, rendering the polymeric molecule spectrally active in the ultraviolet region of the electromagnetic spectrum. Such ultraviolet functionalized silicone polymers are functionalized in a manner that preserves their ability to be photocured via a cationic onium salt photo-catalysis.

BACKGROUND OF THE INVENTION

Silicone release coatings are very, thinly applied coatings of silicone polymers. Typically these coatings are very thinly applied at levels of 1 g/m2 at very high speeds frequently ranging at or above 300 m/min., across paper or film liners that may be as wide as 2 m. Coating imperfections such as pinholes, areas of incomplete coverage, and variations in coating weight may occur in such a high speed operation, even when using sophisticated offset gravure and multi-roll film splitting techniques. The high speed of many coating processes thus can generate a large quantity of poorly coated and therefore unacceptable product in a very short time. Even when the silicone coating is fully cured, such imperfections lead to a coated product that fails to perform as intended.

It therefore is desirable to be able to assess the quality of the silicone coating being applied, as it is applied, i.e. on-line. One possible method of assessing coating quality would be to dissolve spectrophotometrically active fluorescent dyes in the silicone release coating. Since this is possible, then a fluorescence detector downstream of the coating apparatus can spectrophotometrically scan the newly coated product as it is excited by ultraviolet light of the appropriate frequency in a fashion where the fluorescent response of the coating indicates the amount of the coating applied per area of substrate coated. Ultraviolet laser excitation is particularly well suited to such an application.

Since all organic molecules, and particularly silicones, are active in the infrared region of the spectrum, infrared spectral analysis of a coating would be a particularly complicated means of assessing coating quality. Visible dyes would present aesthetic problems that might or might not be undesirable to the end user of the product. Thus by a process of elimination, fluorescence detection of a dye marked coating becomes the method of choice for the purpose of assessing coating quality.

In order to be useful as a fluorescent dye marker an organic compound must have an ultraviolet absorption spectrum that has a fairly high molar extinction coefficient so that it is not necessary to incorporate large quantities of the dye molecule in the formulation. The organic dye marker compound must also be strongly fluorescent, upon excitation at the proper ultraviolet wavelength. This is desirable for two reasons, first large quantities of an additive may impart undesirable performance characteristics to the formulation, and second, most fluorescent ultraviolet dye marker compounds are insoluble in silicones. Such marker compounds are typically crystalline solids possessing a high melting point. These properties are associated with extended molecular structures that possess a great deal of conjugated olefinic bonds, a feature necessary to impart ultraviolet fluorescent activity. The chemical structure that render these compounds spectrophotometrically active in the ultraviolet region of the electromagnetic spectrum also make them polar. This polarity generally leads to poor solubility in polymeric silicone formulations.

The poor solubility of fluorescent dye marker compounds in silicone compositions has been previously solved by modifying the silicone polymer such as the epoxysilicone-polyether block copolymers described in U.S. Pat. Nos. 5,227,410 and 5,240,971. This approach has not been fully satisfactory. Modifying the silicone molecule to improve its compatibility with polar fluorescent dyes tends to change the cure response of the silicone so modified and usually causes a deterioration in the release characteristics of the cured silicone.

Fluorescent active photo-curable silicones are known in the art. U.S. Pat. No. 4,978,731 discloses the incorporation of ultraviolet fluorescent substituents via the hydrosilation of a silyl hydride with an ultraviolet fluorescence active olefinic molecule that becomes an ultraviolet fluorescence active substituent on a silicone polymer:

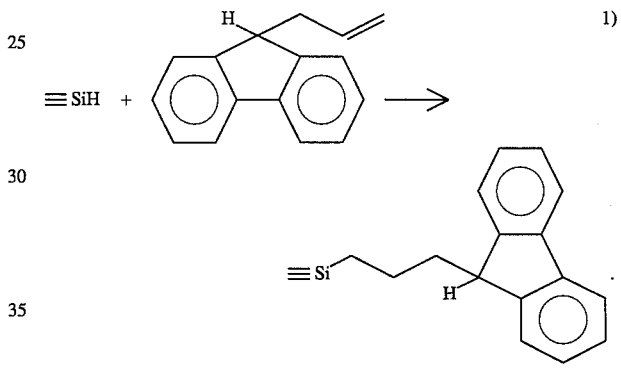

The ultraviolet fluorescent active substituted SiH-containing silicone polymer is then subsequently reacted with a glycidyl ether. Because the glycidyl ether contains epoxy groups, the fluorescent active silicone polymer becomes an ultraviolet fluorescent silicone that is epoxy functionalized as well as photocurable via cationic photocure processes.

It is known to functionalize amino-functional silicone polymers by reacting acid chloride fluorescent materials such as dansyl chloride with the amino group of the silicone polymer:

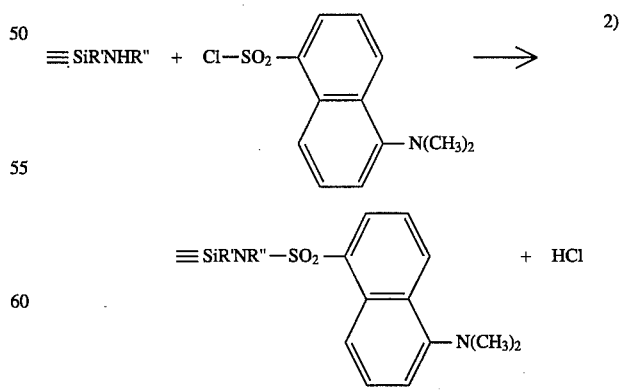

It is also known to functionalize halo-alkyl substituted silicone polymers by reacting hydroxy coumarins as follows:

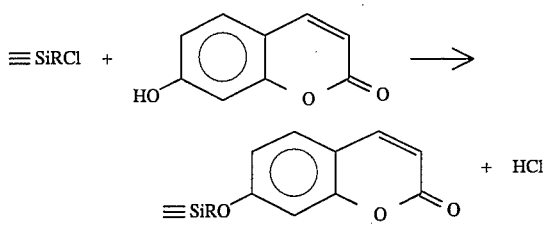

These reactions are disclosed in U.S. Pat. Nos. 5,118,776; 5,176,906; 5,302,371; and 5,107,008 to Ziemelis et al. The silicones of Ziemelis et al. also include a vinyl/silyl hydride functionality that allows their cure via platinum catalyzed hydrosilation, however it is to be particularly noted that none of these materials is photocurable.

SUMMARY OF THE INVENTION

I now disclose that certain compounds that possess ultraviolet spectrophotoraetric fluorescence activity may be chemically incorporated into silicone polymers to simultaneously function as photo-sensitizers and fluorescent dye markers for silicone coatings increasing the quantum efficiency of photo-catalysts and overcoming the poor solubility of fluorescent dye marker compounds in silicones. These fluorescent functionalized silicones have a chemical structure wherein the fluorescent substituent is bonded to the polymeric silicone via a carbon oxygen carbon linkage in contrast to such substituents that are bonded to the polymeric silicone via an all carbon carbon bond linkage.

The present invention thus provides for a fluorescent silicone, a photo-sensitized silicone, or a silicone that is simultaneously fluorescent and photo-sensitized having the formula:

$$MD_nD^E{}_mD^*{}_pM,$$

where

M is selected from the group consisting of $R_3SiO_{1/2}$ and $R_2ESiO_{1/2}$; where each R may be independently selected from the group consisting of monovalent hydrocarbon radicals where E is an epoxide functionalized substituent selected from the group of epoxy ether substituents having the formula $C_8H_{13}O_2$ or the group of alkyl cyclohexeneoxide substituents having the formula $C_9H_{15}O$;

D has the formula $R_2SiO_{2/2}$, where each R may be independently selected from the group consisting of monovalent hydrocarbon radicals;

$D^E$ has the formula $RESiO_{2/2}$ with R selected from the group consisting of monovalent hydrocarbon radicals where E is an epoxide functionalized substituent selected from the group of epoxy ether substituents having the formula $C_8H_{13}O_2$ or the group of alkyl cylcohexeneoxide substituents having the formula $C_9H_{15}O$;

D* is defined as the reaction product of $D^E$ with a compound selected from the group consisting of R'COOH, $(R'CO)_2O$, R'COX, $R'SO_3H$, and $R'SO_2X$ where R' is a fluorescing, photo-sensitizing, or simultaneously fluorescing and photo-sensitizing substituent and X is a halogen; and the subscripts n, m, and p are integers where the sum of n+m+p ranges from about 10 to about 2,000.

The present invention further provides for a fluorescent silicone of the formula;

$$MD_nD^*{}_pM$$

prepared from an epoxy silicone of the formula:

$$MD_nD^E{}_mM,$$

where

M is selected from the group consisting of $R_3SiO_{1/2}$ and $R_2ESiO_{1/2}$; where each R may be independently selected from the group consisting of monovalent hydrocarbon radicals where E is an epoxide functionalized substituent selected from the group of epoxy ether substituents having the formula $C_8H_{13}O_2$ or the group of alkyl cylcohexeneoxide substituents having the formula $C_9H_{15}O$;

D has the formula $R_2SiO_{2/2}$, where each R may be independently selected from the group consisting of monovalent hydrocarbon radicals;

$D^E$ has the formula $RESiO_{2/2}$ with R selected from the group consisting of monovalent hydrocarbon radicals where E is an epoxide functionalized substituent selected from the group of epoxy ether substituents having the formula $C_8H_{13}O_2$ or the group of alkyl cylcohexeneoxide substituents having the formula $C_9H_{15}O$;

D* is defined as the reaction product of $D^E$ with a compound selected from the group consisting of R'COOH, $(R'CO)_2O$, R'COX, $R'SO_3H$, and $R'SO_2X$ where R' is a fluorescing, photo-sensitizing, or simultaneously fluorescing and photo-sensitizing substituent and X is a halogen; where the subscript m has the value of the subscript p and where the sum of the subscripts n and m ranges from about 10 to about 2000.

In addition to the compositions of the present invention the present invention also provides a method of preparing fluorescent silicones of the formula:

$$MD_nD^E{}_{m-p}D^*{}_pM$$

comprising reacting a silicone of the formula $MD_nD^E{}_mM$ with a compound selected from the group consisting of R'COOH, $(R'CO)_2O$, R'COX, $R'SO_3H$, and $R'SO_2X$ where R' is a fluorescing substituent and X is a halogen; and the subscripts m, n and p are integers where the sum of m+n ranges from about 10 to about 2,000.

DETAILED DESCRIPTION OF THE INVENTION

Fluorescent dye marker-functionalized UV (or EB) photocurable epoxysilicone release coatings may be prepared via the reaction of a fluorescent molecule containing at least one acid functionality or functionality convertible to an acid functionality, e.g. an acid halide, with an epoxysilicone via an acid catalyzed oxirane ring opening reaction. Generally the reaction is:

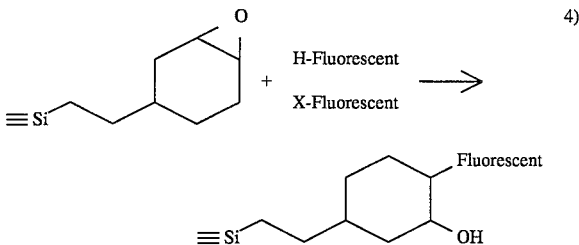

where "H-fluorescent" indicates the acid form of a fluorescing, photo-sensitizing, or simultaneously fluorescing and photo-sensitizing species (or as an alternative "X-fluorescent" indicates the acid halide form of a fluorescing, photo-sensitizing, or simultaneously fluorescing and photo-sensitizing species, the halides including fluoride, chloride, bromide and iodide) or more specifically:

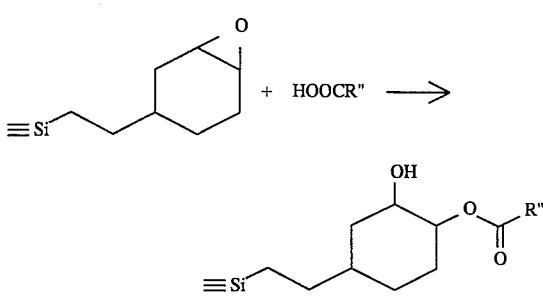

where R" can be dansyl, anthracenyl, phenyl or vinyl group, among others. Thus in the case of dansyl sulfonic acid (5-dimethylamino-naphthalene-1-sulfonic acid), the above reaction is specifically:

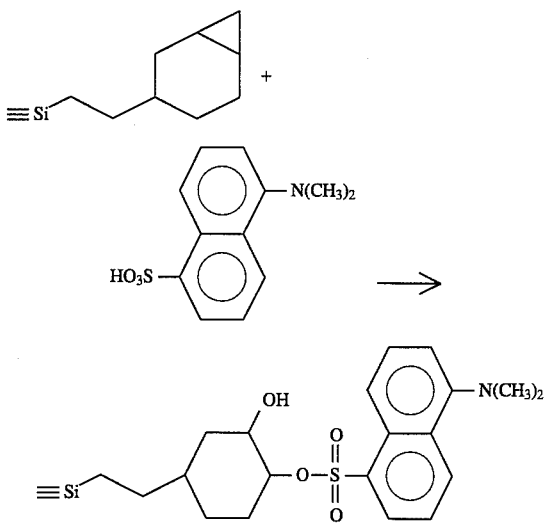

A particularly useful fluorescent material is coumarin-3-carboxylic acid. An epoxy silicone thus can be functionalized according to the following reaction scheme:

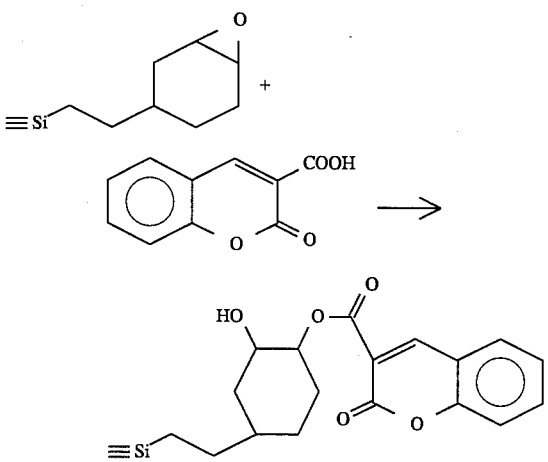

The reaction with carboxylic acid halides (fluorides, chlorides, bromides, or iodides) or with sulfonic acid halides is similarly facile. Thus 100 parts of an epoxysilicone with an epoxy equivalent weight of 1,000, when reacted with one part of coumarin-3-carboxylic acid will yield silicone polymers having approximately 95% of the cycloaliphatic epoxy groups intact, i.e. unreacted, and also containing about 1 weight percent of a fluorescing substituent as well. The reaction is generalizable to any fluorescing, photo-sensitizing, or simultaneously fluorescing and photo-sensitizing radical that can be chemically bonded via an acid substituent by the acid catalyzed oxirane ring opening reaction to an epoxysilicone. Among the fluorescing substituents that may be chemically attached to a silicone polymer are 5-dimethylaminonaphthalene-1-sulfonate (or dansyl), anthracenyl, coumarinyl, xanthanyl, fluoresceinyl, anthraquinyl, acridenyl, and perylenyl. The epoxy-functional fluorescing polydimethylsiloxanes of the present invention have the formula:

$$MD_nD^E{}_{m-p}D^*{}_pM,$$

where $M=R_3SiO_{1/2}$ or $R_2ESiO_{1/2}$, $D=R_2SiO_{2/2}$, $D^E=RESiO_{2/2}$ with R selected from the group consisting of monovalent saturated or unsaturated hydrocarbon radicals, generally having from one to about thirty carbon atoms for alkyl radicals, from two to thirty carbon atoms for alkenyl and alkynyl radicals, from six to thirty carbon atoms for aryl radicals, and from seven to thirty carbon atoms for alkylaryl radicals where E is an epoxy ether substituent of the formula $C_6H_{11}O_2$, e.g.,

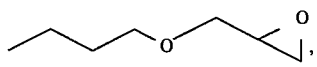

or an alkyl cylcohexenepoxide of the formula $C_8H_{13}O$, e.g.

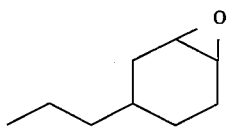

and where $D^*$ is the reaction product of $D^E$ with a compound selected from the group consisting of R'COOH, (R'CO)$_2$O, R'COX, R'SO$_3$H, and R'SO$_2$X with R' a fluorescing, photo-sensitizing, or simultaneously fluorescing and photo-sensitizing substituent and X a halogen, where the halogen may fluoride, chloride, bromide or iodide. Applicant notes that the term fluorescing is hereinafter used to indicate not only fluorescing but also photo-sensitizing or both as matter of semantic simplicity; thus fluorescent may also indicate photo-sensitized or fluorescent and photo-sensitized where appropriate. Preferably R' is a fluorescing substituent selected from the group consisting of 5-dimethylaminonaphthalene-1-sulfonate (dansyl), anthracenyl, coumarinyl, xanthanyl, thioxanthanyl, fluoresceinyl, anthraquinyl, and perylenyl. The subscripts n, m, and p are integers where the sum of n+m+p ranges from about 10 to about 2000, preferably from about 20 to about 400, and most preferably from about 50 to about 150. The preferred compounds of the present invention will have the subscript p less than the subscript m. Additionally, all of the epoxy groups of the compound may be functionalized with fluorescing substituents, in which case, m will be zero, the resulting compound will have the formula:

$$MD_nD^*{}_pM$$

where the sum of the subscripts n and p ranges from about 10 to about 2000, preferably from about 20 to about 400, and most preferably from about 50 to about 150. While the compound $MD_nD^*{}_pM$ may not necessarily be photocurable, it can be used as a fluorescent dye for other silicone formulations.

R may also be independently selected from the group consisting of monovalent alkyl hydrocarbon radicals having from one to thirty carbon atoms, monovalent alkenyl hydrocarbon radicals having from two to thirty carbon atoms, monovalent alkynyl hydrocarbon radicals having from two to thirty carbon atoms, monovalent aryl hydrocarbon radicals having from six to thirty carbon atoms, monovalent alkylaryl hydrocarbon radicals having from seven to thirty carbon atoms, monovalent halogen substituted alkyl hydrocarbon radicals having from one to thirty carbon atoms, monovalent halogen substituted alkenyl hydrocarbon radicals having from two to thirty carbon atoms, monovalent halogen substituted alkynyl hydrocarbon radicals having from two to thirty carbon atoms, monovalent halogen substituted aryl hydrocarbon radicals having from six to thirty carbon atoms, and monovalent halogen substituted alkylaryl hydrocarbon radicals having from seven to thirty carbon atoms.

The reaction leading to the compounds of the present invention is a different reaction from adding a fluorescent moiety to a silicon backbone via a hydrosilation reaction, followed by addition of epoxide groups through the addition of a glycidyl ether. The present synthesis is much more convenient and bonds the fluorescent moiety to the silicone framework via a carbon oxygen bond in contrast to a carbon carbon bond.

The present reaction scheme also allows for a controllable ratio of fluorescent substitution to unreacted epoxy groups. This is accomplished by measuring the epoxy equivalent weight of the epoxy silicone before reacting with the acidic fluorescent specie. By controlling the ratio of fluorescing compound to epoxy groups during the reaction, the amount of fluorescent substitution in the epoxysilicone may be controlled. As demonstrated in the experimental section following, the reaction is quantitative. In addition, since most of the fluorescing species that would be useful are insoluble in epoxysilicones as a solute, chemical incorporation of such a substituent renders the epoxysilicone active for ultraviolet fluorescence, accomplishing the same goal as dissolving a marker compound into the epoxysilicone coating composition by chemically incorporating the fluorescent marker compound as a substituent in a reactive silicone polymer.

Suitable photocatalysts that are preferred for use with the compounds of the present invention are selected from the group consisting of diazonium salts, diaryliodonium salts, trianylsulfonium salts, diaryliodosonium salts, triarylsulfoxonium salts, dialkylphenacylsulfonium salts, and ferrocenium salts. Typically, these cationic photoinitiating salts are salts of perhalohypervalent acids such as tetrafluoroborate, hexafluorophosphate, hexafluoroarsenate, hexafluoroantimonate, perchlorate, trifluoromethylsulfonate, and the like. The compounds of the present invention may also be cured by means of electron beams as long as a cationic photoinitiator is present. The amount of cationic photoinitiator required for ultraviolet or electron beam curing ranges from about 0.1 to about 10 weight percent based on the weight of the silane or siloxane present in the composition.

Further, some of the preferred fluorescent radicals used as substituents in the compounds of the present invention when contained in a chemical system either bound as substituents on a host molecule or present as the free molecular species also function as photo-catalyst sensitizers. By way of example, the hydroxy-ester group derived from the reaction of anthracene-9-carboxylic acid with epoxy, silicones leads to a fluorescing photo-sensitizing substituent:

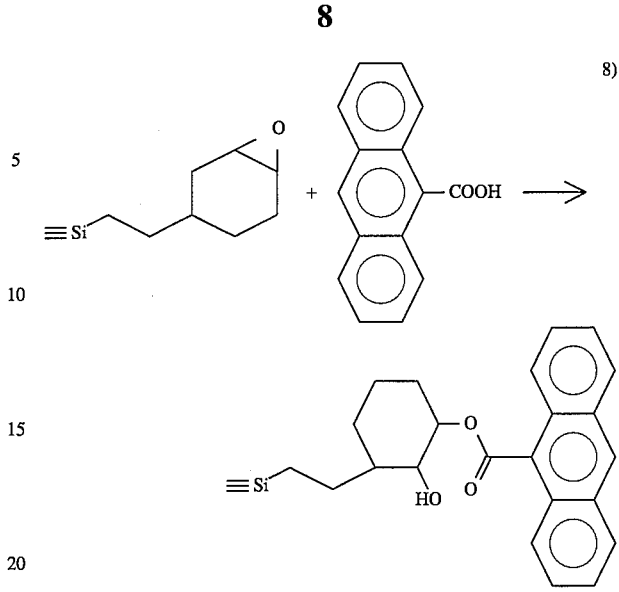

8)

The process of photocatalyst sensitization is a process where a sensitizer molecule (or substituent) absorbs light at a different frequency by reference to the absorption frequency of the photocatalyst and transfers the energy of that absorbed light to the photocatalyst, thereby effectively extending the range of useful incident light to wavelengths of light not usually absorbed. Therefore, the amount of photocatalyst may be reduced by reference to a non-sensitizing fluorescent moiety (substituent or compound) whereby smaller amounts of photocatalyst may be employed achieving the same rates of photocure at the same level of ultraviolet or electron beam flux in the curing process, or the rate of cure of the sensitized, photocatalyzed coating may be increased relative to that of the non-sensitized coating without increasing the amount of photocatalyst present. Thus the compounds of the present invention synthesized with photocatalyst sensitizing fluorescent substituents may, if so desired, utilize smaller amounts of photocatalyst to achieve the same effective cure rate relative to fluorescent substituents where photocatalyst sensitization does not occur. Applicant defines cure time as the time interval between initial exposure to ultraviolet radiation and the time of maximum photocure exotherm as measured by differential photocalorimetry under the conditions and samples sizes as set forth in the experimental section and defines photocatalyst sensitization as being present when photocure times are below about 60 seconds, preferably below about 50 seconds, and most preferably below about 45 seconds. Fluorescing moieties that also act as photocatalyst sensitizers include perylenyl, acridenyl, anthracenyl, fluoresceinyl, xanthanyl, and thioxanthanyl.

It is thus the sense of Applicant's invention to react epoxysilicones with acids or acid halide compounds that create a carbon oxygen carbon bond linking the acid compound to the silicone wherein the acid compound is a species that possesses ultraviolet fluorescence activity, photo-sensitization activity or both. By adjusting the molar ratio of the fluorescent acid compound to the epoxy equivalent of the silicone, partial or complete reaction of the epoxy groups may be achieved.

EXPERIMENTAL

Example 1

900 g a silyl hydride functional linear polydimethylsiloxane polymer having the general formula $M^H D_x D^H_y M^H$ with 850 ppm reactive hydride present was reacted with 98 g of vinylcyclohexeneoxide (VCHO) in the presence of sufficient $RhCl_3((C_4H_9)_2S)_3$ to yield 5 ppm Rh and 0.1 g of methyldicocoamine as taught in U.S. Pat. No. 5,258,480. A cycloaliphatic epoxy-functionalized polymer resulted which was further reacted with 2.0 g of 5-dimethylamino-1-naphthalenesulfonic acid (DNS) and 2.0 g of triethylamine at 120° C. for 16 hours. The reaction mixture was vacuum stripped at 160° C. under nitrogen and subsequently filtered. After filtration to remove suspended solids, a clear fluid was obtained having a viscosity of 300 centistokes at 25° C. that exhibited a strong blue fluorescence when irradiated with broad band ultraviolet light.

Example 2

The procedure utilized in example 1 was repeated using 200 g of the silyl hydride polydimethylsiloxane polymer, 0.1 g DNS and 0.1 g triethylamine at a slightly lower temperature, 115° C. A similar polymer having an identical viscosity was obtained. The reaction product also exhibited a blue fluorescence when irradiated with broad band ultraviolet light.

Example 3

Example 2 was repeated except for increasing the quantity of DNS to 0.2 g (1,000 ppm) and triethylamine to 0.2 g. Identical results were obtained.

Example 4

Example 2 was repeated except for increasing the quantity of DNS to 0.4 g (2,000 ppm) and 0.4 triethylamine. Identical results were obtained.

Example 5

Example 4 was repeated decreasing the reaction time from 16 hours to 4 hours for the 115° to 120° C. reaction period. Identical results were obtained.

Example 6

Example 5 was repeated holding the reaction for 8 hours instead of 4 hours. The results of the first 6 preparations are summarized in Table 1.

TABLE 1

Preparation of DNS Functionalized Epoxysilicones

| Example | DNS (ppm) | Reaction Time (hours) | Viscosity cstk at 25° C. | Fluorescence |
|---|---|---|---|---|
| 1 | 2,000 | 16 | 300 | blue |
| 2 | 500 | 16 | 300 | blue |
| 3 | 1,000 | 16 | 300 | blue |
| 4 | 2,000 | 16 | 300 | blue |
| 5 | 2,000 | 4 | 300 | blue |
| 6 | 2,000 | 8 | 300 | blue |

Example 7

The reaction products from examples 1 through 6 along with an unfunctionalized epoxysilicone were dissolved in methylene chloride at a concentration of 1.0 g per 100 mL of solvent. The ultraviolet absorption spectrum of each solution was measured using a Cary 1700 UV-VIS spectrophotometer. Those samples that had been functionalized with DNS exhibited a medium strong absorption peak centered at 349 nm. The results are tabulated in Table 2.

TABLE 2

Fluorescence Peak Intensity versus ppm DNS Reacted with Epoxy Silicone

| Example | ppm DNS in Reaction Mix | Absorption at 349 nm arbitrary units |
|---|---|---|
| 1 | 2,000 | 0.308 |
| 2 | 500 | 0.060 |
| 3 | 1,000 | 0.130 |
| 4 | 2,000 | 0.302 |
| 5 | 2,000 | 0.293 |
| 6 | 2,000 | 0.286 |
| control | 0 | 0.002 |

A linear relationship exists between the amount of starting DNS present in the reaction mixture for the functionalization of epoxysilicones and the ultraviolet absorption spectrum of the resultant polymeric product. Assuming that Beer's Law is valid in this case, the ultraviolet absorption shows that incorporation of the fluorescent dye marker compound, DNS, is quantitative and is complete within a four hour reaction period at 115° to 120° C.

Example 8

100 parts by weight of the polymer from example 1 were blended with 2 parts by weight of a 50 weight percent solution of bis(dodecylphenyl)iodonium hexafluoroantimonate sensitized with 2 weight percent isopropylthioxanthone in an alkylglycidyl ether. The catalyzed coating bath was applied to polyethylene kraft PEK and Kammerer AV100® glassine liner substrates at 50 feet per minute (fpm) line speed using a Dixon 3 roll offset gravure coater to provide a range of different coat weights. Cure was accomplished in every case by exposure to two focused Fusion Systems H lamp ultraviolet lamps providing smear and migration free silicone release coatings immediately offline.

Samples of the cured silicone were analyzed for coat weight using an Oxford x-ray fluorescence (XRF) instrument. The same samples were also analyzed for fluorescence response using an Oriel fluorescence detector instrument to determine if the fluorescent dye probe, chemically bound to the epoxysilicone polymer, provided a useful means of coat weight determination when correlated with the XRF measurements.

The cured samples were irradiated at 380 nm wavelength to excite the fluorescent groups and the fluorescence intensifies at 537.5 nm for the PEK samples and at 506 nm for the glassine samples were measured. The results obtained for the samples were corrected for fluorescence of the uncoated paper (control). Each data point reported in Table 3 represents the average of 100 measurements taken at various positions for each sample irradiated.

TABLE 3

Fluorescence Emission Intensity versus Coat Weight for Fluorescence Functionalized Epoxysilicone Release Coatings.

| Substrate | Coat Weight by XRF g/m$^2$ | Fluorescence Emission arbitrary units × 10$^4$ |
|---|---|---|
| PEK | 0.69 | 2.05 |
| PEK | 0.92 | 2.87 |
| PEK | 1.79 | 5.90 |
| Glassine | 0.70 | 9.00 |

TABLE 3-continued

Fluorescence Emission Intensity versus Coat Weight for Fluorescence Functionalized Epoxysilicone Release Coatings.

| Substrate | Coat Weight by XRF g/m$^2$ | Fluorescence Emission arbitrary units × 10$^4$ |
| --- | --- | --- |
| Glassine | 0.90 | 12.00 |
| Glassine | 1.80 | 22.50 |

The results in Table 2 demonstrate a linear response between coat weight determined by the conventional XRF technique and the x-ray fluorescence technique using the fluorescence functionalized epoxysilicone. This experiment demonstrates that determination of coat weight of these DNS functionalized epoxysilicones by fluorescence detection is feasible, and, in principle, such detection could be accomplished on-line.

Example 9

100 g of the epoxysilicone polymer as prepared in the first part of example 1 was weighed into a 500 cc flask and agitated at 115° C. in the presence of 0.1 g -anthracenecarboxylic acid (ACA) and 0.15 g triethylamine for 15 hours. The triethylamine was removed from the reaction mixture by vacuum stripping. The product was filtered yield a clear fluid having a viscosity of 300 centistokes which displayed a strong violet fluorescence when exposed to black light ultraviolet radiation.

Example 10

The procedure of example 9 was repeated except that 0.2 g of ACA and 0.3 g triethylamine were used. The resulting clear product had a viscosity of 300 centistokes and a strong violet fluorescence.

Example 11

The procedure of example 9 was repeated except that 0.4 g ACA and 0.5 g triethylamine were used. The resulting clear product had a viscosity of 300 centistokes and a strong violet fluorescence.

It should be noted that 9-anthracenecarboxylic acid is completely immiscible in epoxysilicone fluids. Very little unreacted solid crystalline 9-anthracenecarboxylic acid was detected following the preparations of examples 9 through 11 which is taken to indicate that the anthracenecarboxylic acid was indeed chemically bound to the silicone polymer.

The three fluorescent epoxysilicones prepared in examples 9 through 11 were used to prepare three coating baths by mixing 100 parts by weight of each of the three fluorescence functionalized epoxysilicones with 2 parts by weight of the iodonium photocatalyst solution previously described. A control bath of the non-fluorescent functionalized epoxysilicone was also prepared. The baths were used to coat PEK liner specimens, then exposed to two Hanovia arc-fired medium pressure mercury vapor ultraviolet lamps mounted across a 12 inch conveyor in an RPC model QC 1202 Lab processor to effect cure. Total lamp power and conveyor speed were varied to determine the combination of minimum lamp power and maximum conveyor speed where smear- and migration-free silicone release coatings were obtained. The results obtained demonstrated that all four baths cured acceptably at the same 400 watt/inch total ultraviolet lamp power at 400 feet per minute (fpm) conveyor speed. Thus chemical modification of the epoxy silicone with up to 4,000 ppm ACA (example 11) did not slow photocure response.

In a separate experiment, the control and the 1,000 ppm ACA (example 9) material showed identical cure response on a PEK liner using one Fusion H 450 watts/inch ultraviolet lamp as an ultraviolet source coated at 800 fpm line speed.

The product from example 9 was used to prepare coatings on three different substrates. The machine settings were varied to produce four different coat weights on the substrates. Samples of the cured coatings were analyzed for fluorescence response using the Oriel instrumentation previously described. In these evaluations, the ultraviolet excitation frequency was 0380 nm wavelength and the 503 nm fluorescence was monitored on the Super Calendered kraft (SCK) substrate and glassine substrate. The 530 nm fluorescence was monitored for samples coated onto the PEK substrate.

TABLE 4

Coat Weight of 1,000 ppm Fluorescence Functionalized Epoxysilicone Release Coatings on SCK Substrate

| Coat Weight, by X-ray lbs./ream | Fluorescence Intensity (arbitrary units) × 10$^{-5}$ |
| --- | --- |
| 0.59 | 3.45 |
| 0.76 | 3.54 |
| 0.83 | 3.86 |
| 1.15 | 4.49 |
| 0 (blank) | 2.30 |

The data presented in Table 4 may be linearly regressed establishing the following correlation:

$$\text{Fluorescence Intensity} = 1.905 \times 10^5 \text{ (coat weight)} + 2.3 \times 10^5$$

which has a correlation coefficient of 0.999.

TABLE 5

Coat Weight of 1,000 ppm Fluorescence Functionalized Epoxysilicone Release Coatings on PEK Substrate

| Coat Weight, by X-ray lbs./ream | Fluorescence Intensity (arbitrary units) × 10$^{-5}$ |
| --- | --- |
| 0.60 | 1.39 |
| 0.71 | 1.45 |
| 0.83 | 1.52 |
| 1.15 | 1.63 |
| 0 (blank) | 1.15 |

The data presented in Table 5 may be linearly regressed establishing the following correlation:

$$\text{Fluorescence Intensity} = 1.15 \times 10^5 \text{ (coat weight)} + 4.23 \times 10^4$$

which has a correlation coefficient of 0.988.

TABLE 6

Coat Weight of 1,000 ppm Fluorescence Functionalized Epoxysilicone Release Coatings on Glassine Substrate

| Coat Weight, by X-ray lbs./ream | Fluorescence Intensity (arbitrary units) × 10$^{-5}$ |
| --- | --- |
| 0.63 | 3.25 |
| 0.76 | 3.50 |
| 0.92 | 3.68 |
| 0.98 | 4.07 |
| 0 (blank) | 1.91 |

The data presented in Table 6 may be linearly regressed establishing the following correlation:

Fluorescence Intensity=$2.07 \times 10^5$ (coat weight)+$1.91 \times 10^5$ which has a correlation coefficient of 0.94.

The data presented in tables 4, 5, and 6 demonstrate that epoxysilicones that are fluorescence functionalized with 9-anthracenecarboxylic acid are suitable for on-line detection of coat weight as are the dansyl functionalized epoxysilicones.

Example 12

Differential photocalorimetric experiments were performed using a Perkin-Elmer DSC 7 differential calorimeter fitted with a photocure accessory that utilized a 200 watt high pressure xenon vapor ultraviolet lamp. 3 mg samples (100 parts by weight) catalyzed with 2 parts by weight of an unsensitized 50 weight percent solution of bis(dodecylphenyl)iodonium hexafluoroantimonate in glycidyl ether were isothermally irradiated at 35° C. Lamp exposure was started at 0.5 minute ($t_0$) and the time to peak exotherm ($t_{peak}$) and total integrated exotherm ($\Delta_H$) were determined in each case. The results are tabulated in Table 7.

TABLE 7

Differential Photocalorimetry of Photocurable Fluorescent Epoxysilicone Containing Fluorescence Centers Derived from 9-Anthracenecarboxylic Acid

| ppm ACA | Example | ($t_{peak}$) min. | ($\Delta_H$) J/g | Cure Speed $t_{peak} - t_0$ sec. | Sample Size mg |
|---|---|---|---|---|---|
| 0 (control) | — | 1.816 | 17.12 | 78.96 | 2.919 |
| 1,000 | 9 | 1.263 | 16.88 | 45.78 | 2.802 |
| 2,000 | 10 | 1.223 | 16.70 | 43.38 | 2.807 |
| 4,000 | 11 | 1.143 | 17.81 | 38.58 | 3.013 |
| 10,000 | note 1 | 1.060 | 29.57 | 33.60 | 2.856 |

Note 1:
The sample possessing an ACA concentration of 10,000 ppm ACA was prepared by varying the procedure of examples 9, 10, and 11 to increase the amount of 9-anthracenecarboxylic acid and triethylamine proportionally to obtain a product with the desired level of functionalization, i.e. 10,000 ppm.

The results tabulated in Table 7 show that the anthracenyl functionalized epoxysilicones exhibit a faster photocure than a standard photocurable epoxysilicone. Since the speed of the photocure has been increased, the fluorescent functionalization acts to sensitize the photocatalyst. For purposes of definition, Applicant herewith defines photocatalyst sensitization as any photocurable epoxysilicone composition exhibiting a cure time as defined by the experimental conditions of example 12 below about 60 seconds, preferably below about 50 seconds, and most preferably below about 45 seconds.

Definitions

For purposes of clarity Applicant defines the following chemical structures as herein before recited in the specification to be the following:

dansyl:

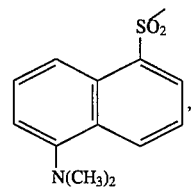

it should be noted that the methyl groups of the dimethylamino substituent may be replaced with other one to ten carbon atom alkyl groups;

anthracenyl:

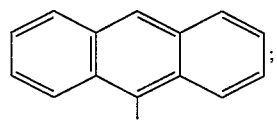

coumarinyl:

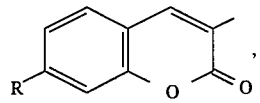

where R is selected from the group consisting of hydrogen, hydroxyl, and dialkylamino where the alkyl groups are one to ten carbon atom alkyl groups;

xanthanyl:

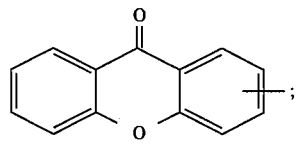

thioxanthanyl:

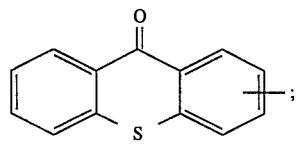

acridinyl:

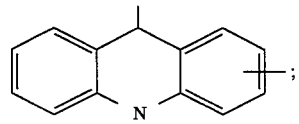

fluoresceinyl:

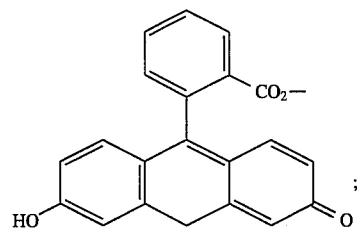

anthraquinyl:

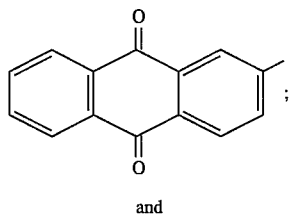

and perylenyl:

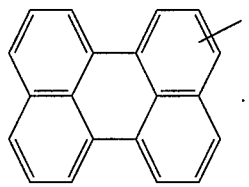

The chemical structures of the fluorescent substituent groups have been drawn with an unsatisfied chemical bond. That unsatisfied chemical bond is the structural equivalent of the -yl nomenclature and indicates the point of attachment to the carboxylic acid, carboxylic acid halide, sulfonic acid or sulfonyl halide or the like as previously described that reacts with the epoxy groups of the epoxy functionalized silicone constituting the compounds of the present invention. Thus by reference to equation 4), the species designated by H-Fluorescent or X-Fluorescent are the species of the above list with a carboxyl group, —COO—, an acyl group —CO—, an —SO$_2$— group or an —SO$_3$— group (with the exception of the dansyl moiety where this is already indicated) attached at the point of the unsatisfied bond and the other unsatisfied bond of the carboxyl and acyl groups is satisfied by hydrogen or a halide; and the sulfur containing species are satisfied by a halide for the SO$_2$ group and by hydrogen for the SO$_3$ group. Further, where such an unsatisfied bond is drawn across or bisecting an existing chemical bond, such a graphical representation indicates that the bond between the fluorescent substituent or moiety may be bonded to any one of several atoms in that fluorescent structure (in the instant cases, carbon atoms). Applicant notes that these fluorescent chemical groups may be further functionalized by various substituents that do not affect the fluorescing activity, thus predictable structural homologues and analogs routinely achievable by the known techniques of synthetic organic chemistry are intended to be functional equivalents of these fluorescing structures and therefore covered by the claims appended hereto.

All U.S. patents referenced herein are herewith specifically incorporated by reference.

Having described the invention that which is claimed is:

1. A photocurable silicone of the formula:

$$MD_nD^E{}_{m-p}D^*{}_pM,$$

where

M is selected from the group consisting of $R_3SiO_{1/2}$ and $R_2ESiO_{1/2}$; where each R is independently selected from the group consisting of monovalent alkyl hydrocarbon radicals having from one to thirty carbon atoms, monovalent alkenyl hydrocarbon radicals having from two to thirty carbon atoms, monovalent alkynyl hydrocarbon radicals having from two to thirty carbon atoms, monovalent aryl hydrocarbon radicals having from six to thirty carbon atoms, monovalent alkylaryl hydrocarbon radicals having from seven to thirty carbon atoms, monovalent halogen substituted alkyl hydrocarbon radicals having from one to thirty carbon atoms, monovalent halogen substituted alkenyl hydrocarbon radicals having from two to thirty carbon atoms, monovalent halogen substituted alkynyl hydrocarbon radicals having from two to thirty carbon atoms, monovalent halogen substituted aryl hydrocarbon radicals having from six to thirty carbon atoms, and monovalent halogen substituted alkylaryl hydrocarbon radicals having from seven to thirty carbon atoms; where E is an epoxide functionalized substituent selected from epoxy ether substituents having the formula $C_6H_{11}O_2$ or alkyl cyclohexeneoxide substituents having the formula $C_8H_{13}O$;

D has the formula $R_2SiO_{2/2}$, where R is as previously defined and each R is independently selected;

$D^E$ has the formula $RESiO_{2/2}$ with R as previously defined where E is an epoxide functionalized substituent selected from epoxy ether substituents having the formula $C_6H_{11}O_2$ or alkyl cylcohexeneoxide substituents having the formula $C_8H_{13}O$;

$D^*$ is defined as the reaction product of $D^E$ with a compound selected from the group consisting of R'COOH, (R'CO)$_2$O, R'COX, R'SO$_3$H, and R'SO$_2$X where R' is a fluorescing substituent and X is a halogen; and the subscripts n, m, and p are integers where the sum of n+m+p ranges from about 10 to about 2,000 whereby said silicone is fluorescent or fluorescent and photo-sensitizing.

2. A silicone of the formula;

$$MD_nD^*{}_pM$$

prepared from an epoxy silicone of the formula:

$$MD_nD^E{}_mM,$$

where

M is selected from the group consisting of $R_3SiO_{1/2}$ and $R_2ESiO_{1/2}$; where each R may be independently selected from the group consisting of monovalent alkyl hydrocarbon radicals having from one to thirty carbon atoms, monovalent alkenyl hydrocarbon radicals having from two to thirty carbon atoms, monovalent alkynyl hydrocarbon radicals having from two to thirty carbon atoms, monovalent aryl hydrocarbon radicals having from six to thirty carbon atoms, monovalent alkylaryl hydrocarbon radicals having from seven to thirty carbon atoms, monovalent halogen substituted alkyl hydrocarbon radicals having from one to thirty carbon atoms, monovalent halogen substituted alkenyl hydrocarbon radicals having from two to thirty carbon atoms, monovalent halogen substituted alkynyl hydrocarbon radicals having from two to thirty carbon atoms, monovalent halogen substituted aryl hydrocarbon radicals having from six to thirty carbon atoms, and monovalent halogen substituted alkylaryl hydrocarbon radicals having from seven to thirty carbon atoms; where E is an epoxide functionalized substituent selected from epoxy ether substituents having the formula $C_6H_{11}O_2$ or alkyl cyclohexeneoxide substituents having the formula $C_8H_{13}O$;

D has the formula $R_2SiO_{2/2}$, where R is as previously defined and each R is independently selected;

$D^E$ has the formula $RESiO_{2/2}$ with R as previously defined where E is an epoxide functionalized substituent selected from epoxy ether substituents having the formula $C_6H_{11}O_2$ or alkyl cylcohexeneoxide substituents having the formula $C_8H_{13}O$;

D* is defined as the reaction product of $D^E$ with a compound selected from the group consisting of R'COOH, (R'CO)$_2$O, R'COX, R'SO$_3$H, and R'SO$_2$X where R' is a fluorescing substituent and X is a halogen; where the subscript m has the value of the subscript p and where the sum of the subscripts n and p ranges from about 10 to about 2000 whereby said silicone is fluorescent or fluorescent and photo-sensitizing.

3. The silicone of claim 1 where the fluorescing substituent is selected from the group consisting of dansyl, anthracenyl, coumarinyl, xanthanyl, thioxanthanyl, fluoresceinyl, anthraquinyl, acridenyl and perylenyl.

4. The silicone of claim 2 where the fluorescing substituent is selected from the group consisting of dansyl, anthracenyl, coumarinyl, xanthanyl, thioxanthanyl, fluoresceinyl, anthraquinyl, and acridenyl, perylenyl.

5. A method of preparing silicones of the formula:

$$MD_nD^E{}_{m-p}D^*{}_pM$$

where

M is selected from the group consisting of $R_3SiO_{1/2}$ and $R_2ESiO_{1/2}$; where each R is independently selected from the group consisting of monovalent alkyl hydrocarbon radicals having from one to thirty carbon atoms, monovalent alkenyl hydrocarbon radicals having from two to thirty carbon atoms, monovalent alkynyl hydrocarbon radicals having from two to thirty carbon atoms, monovalent aryl hydrocarbon radicals having from six to thirty carbon atoms, monovalent alkylaryl hydrocarbon radicals having from seven to thirty carbon atoms, monovalent halogen substituted alkyl hydrocarbon radicals having from one to thirty carbon atoms, monovalent halogen substituted alkenyl hydrocarbon radicals having from two to thirty carbon atoms, monovalent halogen substituted alkynyl hydrocarbon radicals having from two to thirty carbon atoms, monovalent halogen substituted and aryl hydrocarbon radicals having from six to thirty carbon atoms, and monovalent halogen substituted alkylaryl hydrocarbon radicals having from seven to thirty carbon atoms; where E is an epoxide functionalized substituent selected from epoxy ether substituents having the formula $C_6H_{11}O_2$ or alkyl cyclohexeneoxide substituents having the formula $C_8H_{13}O$;

D has the formula $R_2SiO_{2/2}$, where R is as previously defined and each R is independently selected;

$D^E$ has the formula $RESiO_{2/2}$ with R and E as previously defined and

D* is defined as the reaction product of $D^E$ with a compound selected from the group consisting of R'COOH, (R'CO)$_2$O, R'COX, R'SO$_3$H, and R'SO$_2$X where R' is a fluorescing substituent and X is a halogen; and the subscripts n, m, and p are integers where the sum of n+m+p ranges from about 10 to about 2,000 whereby said silicone is fluorescent or fluorescent and photo-sensitizing, comprising reacting a silicone of the formula $MD_nD^E{}_mM$ with a compound selected from the group consisting of R'COOH, (R'CO)$_2$O, R'COX, R'SO$_3$H, and R'SO$_2$X where R' is a fluorescing substituent and X is a halogen.

6. The method of claim 5 wherein the subscript p is equal to the subscript m.

7. The method of claim 5 wherein the fluorescing substituent R' is selected from the group consisting of dansyl, anthracenyl, coumarinyl, xanthanyl, thioxanthanyl, fluoresceinyl, anthraquinyl, acridenyl and perylenyl.

8. The composition of claim 1 further comprising a photocatalyst.

9. The composition of claim 8 wherein said photocatalyst is selected from the group consisting of diazonium salts, diaryliodonium salts, triarylsulfonium salts, diaryliodosonium salts, triarylsulfoxonium salts, dialkylphenacylsulfonium salts, and ferrocenium salts.

10. The composition of claim 9 wherein said salts are selected from the group consisting of tetrafluoroborate, hexafluorophosphate, hexafluoroarsenate, hexafluoroantimonate, perchlorate, and trifluoromethylsulfonate.

11. The silicone of claim 3 wherein the cure speed as measured by differential photocalorimetry is below about 60 seconds.

12. The silicone of claim 3 wherein the cure speed as measured by differential photocalorimetry is below about 50 seconds.

13. The silicone of claim 3 wherein the cure speed as measured by differential photocalorimetry is below about 45 seconds.

14. The silicone of claim 4 wherein the cure speed as measured by differential photocalorimetry is below about 60 seconds.

15. The silicone of claim 4 wherein the cure speed as measured by differential photocalorimetry is below about 50 seconds.

16. The silicone of claim 4 wherein the cure speed as measured by differential photocalorimetry is below about 45 seconds.

* * * * *